(12) United States Patent  (10) Patent No.: US 6,671,994 B1
Klein  (45) Date of Patent: Jan. 6, 2004

(54) FISHING BOBBER WITH SIGNALING FEATURE

(76) Inventor: Darrel J. Klein, 1866 - 380th St., Breckenridge, MN (US) 56520-9405

( * ) Notice: Subject to any disclaimer, the term of this patent is extended or adjusted under 35 U.S.C. 154(b) by 0 days.

(21) Appl. No.: 10/163,352

(22) Filed: Jun. 4, 2002

(51) Int. Cl.$^7$ ............................................. A01K 93/02
(52) U.S. Cl. .......................................... 43/17; 43/17.5
(58) Field of Search .................. 43/17, 44.87, 44.9, 43/44.91, 44.94, 44.88, 44.92, 44.93, 44.95, 17.5

(56) References Cited

U.S. PATENT DOCUMENTS

| | | | | |
|---|---|---|---|---|
| 989,145 A | * | 4/1911 | Hatchett | 43/17 |
| 2,722,763 A | * | 11/1955 | Miner et al. | 43/17 |
| 3,382,598 A | * | 5/1968 | Wilson | 43/17 |
| 4,437,255 A | * | 3/1984 | Reed | 43/17 |
| 4,731,946 A | * | 3/1988 | Blythe et al. | 43/17 |
| 4,928,419 A | * | 5/1990 | Forrestal | 43/17 |
| 4,996,788 A | * | 3/1991 | Wieting et al. | 43/17 |
| 5,097,618 A | * | 3/1992 | Stoffel | 43/17 |
| 5,157,857 A | * | 10/1992 | Livingston | 43/17 |
| 5,241,774 A | * | 9/1993 | Rayburn | 43/44.92 |
| 5,404,668 A | * | 4/1995 | Christensen | 43/44.87 |
| 5,737,868 A | * | 4/1998 | Rikard | 43/44.93 |
| 5,937,566 A | * | 8/1999 | Buczkowski et al. | 43/17.5 |
| 6,138,398 A | * | 10/2000 | Livingston | 43/17 |
| 6,170,189 B1 | * | 1/2001 | Klein | 43/17 |
| 6,374,532 B1 | * | 4/2002 | Klein | 43/17 |
| 6,397,510 B1 | * | 6/2002 | Klein | 43/17 |
| 6,487,812 B2 | * | 12/2002 | Johnson | 43/17 |

FOREIGN PATENT DOCUMENTS

| | | | |
|---|---|---|---|
| DE | 3807765 B1 | * | 3/1989 |
| EP | 769244 B1 | * | 4/1997 |
| GB | 2148081 B1 | * | 5/1985 |
| GB | 2244196 B1 | * | 11/1991 |
| GB | 2245467 B1 | * | 1/1992 |
| GB | 2314751 B1 | * | 1/1998 |
| JP | 64-37236 B1 | * | 2/1989 |
| JP | 1-91731 B1 | * | 4/1989 |
| JP | 3-72831 B1 | * | 3/1991 |
| JP | 4-187040 B1 | * | 7/1992 |
| JP | 11-23708 B1 | * | 1/1999 |

* cited by examiner

Primary Examiner—Darren W. Ark
(74) Attorney, Agent, or Firm—James V. Harmon

(57) ABSTRACT

A fishing bobber includes a strike-indicating signal producing transmitter, e.g. a radio transmitter, for transmitting a radio signal to the fisherman when there is a strike on the line. The bobber includes a bobber body adapted to float on a body of water. A fishing line is connected to it during use. The signal transmitter, which may be a lamp, an audible alarm or radio transmitter is supported by and preferably housed within the bobber. Operatively connected to the transmitter are a pair of probes or electrodes for actuating the transmitter. A sensing means is connected to the probes to detect a current passing between them in response to a fish exerting tension on the fishing line to thereby operate the signal transmitter so as to signal the fisherman, e.g. by broadcasting, a radio signal to alert the fisherman when a fish has struck the bait. One preferred form the bobber includes a pair of electrical probes, i.e. electrodes coupled through a sensing circuit for actuating the signal transmitter when submerged in water by a strike on the line so as to permit an electrical circuit to be completed between the probes.

10 Claims, 2 Drawing Sheets

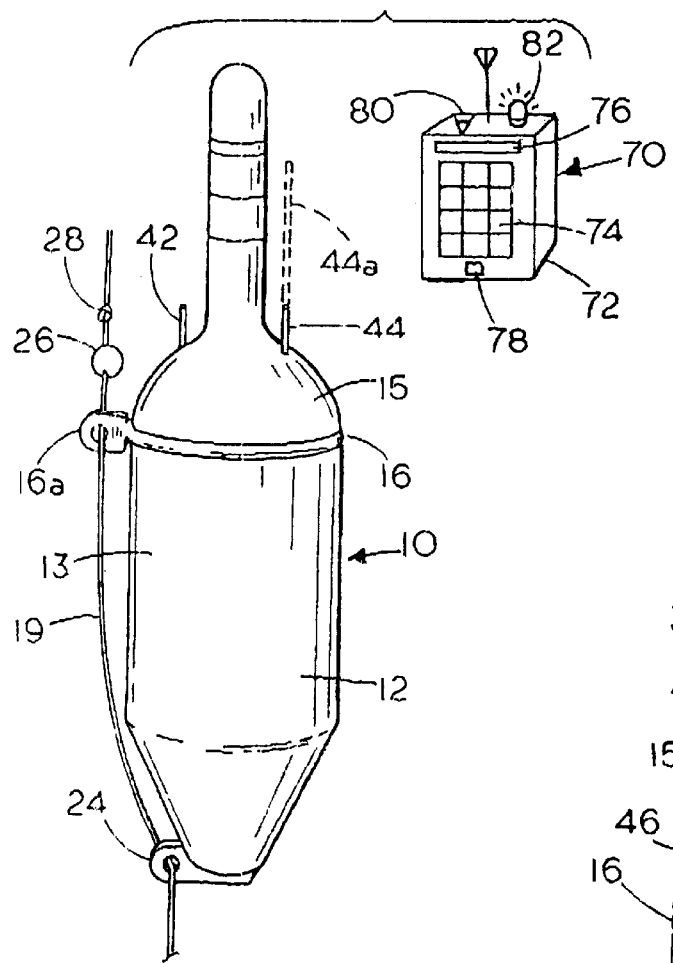
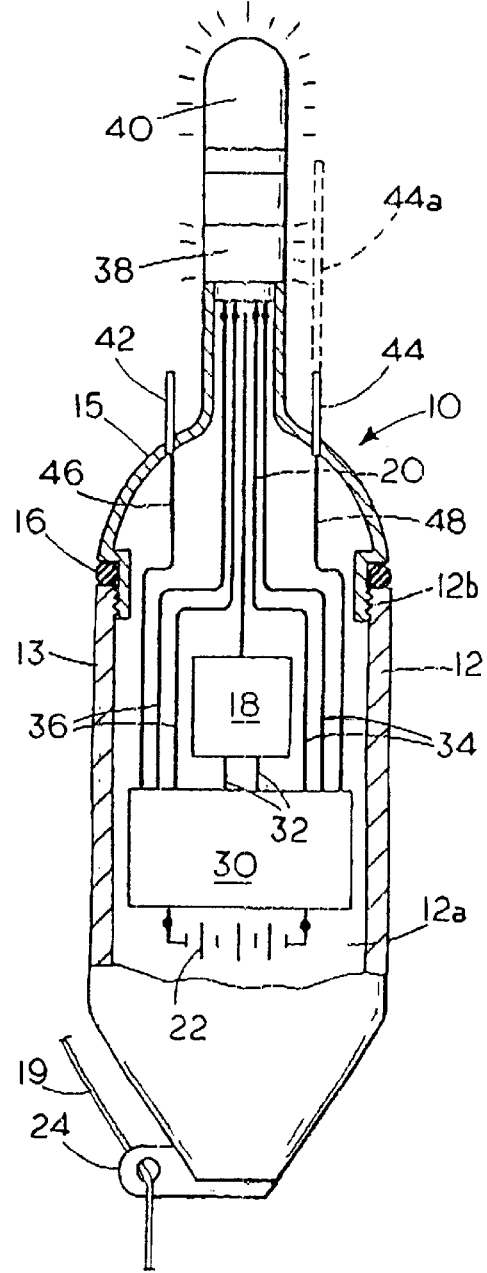

FISHING BOBBER WITH SIGNALING FEATURE

FIELD OF THE INVENTION

This invention relates to fishing and more particularly to a fishing bobber having a signaling device for indicating a strike.

BACKGROUND OF THE INVENTION

A variety of strike indicators have been used with various articles of fishing equipment. One is a light indicator operated by a battery. When a fish strikes, the light is turned on. Another common indicator is a flag, which is elevated when there is a strike on the line. The bobber described in my prior U.S. Pat. No. 6,397,510 which is incorporated herein by reference requires moving parts that close an electrical switch. Prior systems, moreover, are not always reliable, particularly when the fisherman is busy with other activities, is resting or in the fish house where the fishing equipment cannot be seen. Accordingly, there exists a need for a more highly effective indicator to let the fisherman know when there is a strike on the line even if he is occupied with other duties or is in an area where the fishing equipment cannot be seen.

In view of these shortcomings, it is a primary object of the present invention to provide an improved fishing bobber which is inexpensive, light in weight, rugged in construction, and with no moving parts, but yet will reliably signal the fisherman when there is a strike on the line without the need for a visible indicator.

Another object is to provide a way of actuating an indicator or signaling device by means of an electrical sensor as a part of the fishing bobber.

Yet another object is to provide an improved indicator for signaling a fish on the line which has no moving parts for operating a switch and yet can be adjusted to operate under different conditions and allows different bobbers to be easily distinguished from one another.

These and other more detailed and specific objects of the present invention will be better understood by reference to the following figures and detailed description which illustrate by way of example of but a few of the various forms of the invention within the scope of the appended claims.

SUMMARY OF THE INVENTION

The invention provides a fishing bobber having a strike-indicating signal producing transmitter, e.g. a radio transmitter, for transmitting a radio signal to the fisherman when there is a strike on the line. The bobber includes a bobber body adapted to float on a body of water. A fishing line is connected to it during use. The signal transmitter, which may be a lamp, an audible alarm or radio transmitter is supported by and preferably housed within the bobber. Operatively connected to the transmitter are a pair of probes or electrodes for actuating the transmitter. A sensing means is connected to the probes to detect a current passing between them in response to a fish exerting tension on the fishing line to thereby operate the signal transmitter so as to signal the fisherman, e.g. by broadcasting, a radio signal to alert the fisherman when a fish has struck the bait. One preferred form the bobber includes a pair of electrical probes, i.e. electrodes coupled through a sensing circuit for actuating the signal transmitter when submerged in water so as to permit an electrical circuit to be completed between the probes when the bobber is pulled down by a strike.

BRIEF DESCRIPTION OF THE FIGURES

FIG. 1 is a perspective view partly in section of a bobber and radio receiver in accordance with the invention.

FIG. 1A is a vertical sectional view of the bobber of FIG. 1 on a larger scale in accordance with the invention.

DETAILED DESCRIPTION OF THE INVENTION

Refer now to the drawings in which the same numerals refer to corresponding parts in the several views.

Figure 2:
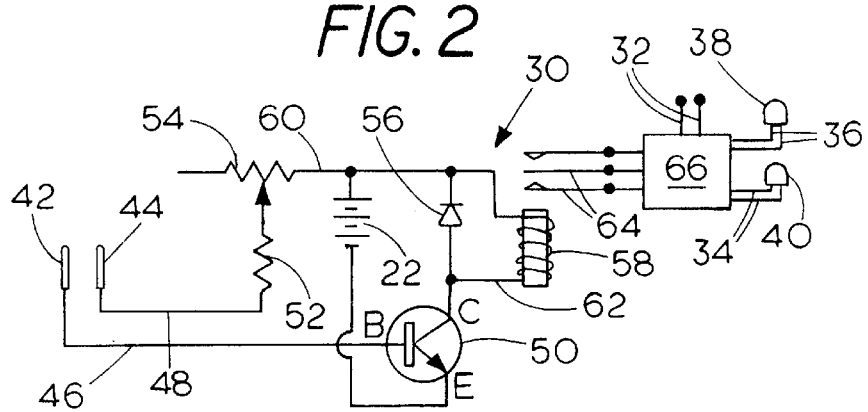
FIG. 2 is an electrical circuit diagram of one form of sensor in accordance with the invention.

FIG. 1 and 2 illustrate a bobber 10 in accordance with the invention and a radio receiver 70 which is in the possession of the fisherman who may be at some distance, e.g., 20' to 200', from the bobber 10. The bobber 10 includes a bobber body 12, that can be formed from metal or plastic which in this case is hollow and includes an inner vertical chamber 12a. The bobber body 12 can be provided with a bottom portion 13 that screws over an upper portion 15 at 12b so that the bobber body 12 can be opened when required. Inside the bobber body 12 is a radio transmitter 18 having an aerial 20 and replaceable battery 22.

The threaded connection between the sections 13 and 15 is sealed by an "O" ring 16 that has a perforated lateral flange 16a which can be used as a guide to hold an upper portion of a fishing line 19. The lower portion of the line 19 passes through a perforated metal or plastic tab 24 that extends laterally from the bottom of the bobber body 12. To help hold the line 19 in place, a bead 26 and knot or other retainer 28 are provided on the line 19 above the flange 16a.

The actuating arrangement for operating the transmitter will now be described with particular reference to FIGS. 1A and 2. A sensing circuit 30 provided in the chamber 12a includes output leads 32 that are wired to the transmitter 18. Two additional pairs of outlet leads 34 and 36 are connected to lamps such as LED's 38 and 40 respectively. A pair of externally projecting electrically conductive, e.g. metallic probes 42 and 44 are wired to the sensing circuit 30 by means of input leads 46 and 48 respectively. At least one probe is positioned above the normal water line of the bobber 10. The probes 42 and 44 can serve as a switch as described below. One or both probes can be extendable, if desired, as show at 44a in the manner of a telescoping antenna (as used for example, on cordless telephones) to aid in controlling sensitivity of the sensing circuit 30. If the probe 44 is extended further or is moved in the direction of probe 42, the sensitivity of the bobber 10 will be changed.

Typical sensing circuit 30 will now be described by way of example in connection with FIG. 2. It should be understood, however, that the present invention is not limited to the particular apparatus, method or mode of operation described. The probe 42 is connected by conductor 46 to the base of a bipolar transistor 50 while probe 44 is connected by conductor 48 through resistor 52 to a potentiometer 54 which is in turn wired to the battery 22, a diode 56 and a relay coil 58 by a conductor 60. The coil 58 is wired at 62 to the diode 56 and the collector of the transistor 50. The battery 22 is wired across the conductor 60 and the emitter of the transistor 50. When the relay coil 58 is energized, the relay points 64 close, connecting a battery 66 to the LED's 38 and 40 and to the transmitter 18. Before placing the circuit 30 in operation, the potentiometer 54 is adjusted so that the transistor 50 will be energized as soon as the probes 42 and 44 are placed in water. By increasing or decreasing the resistance of 54, the sensitivity of the instrument can be changed as desired to meet the conditions of use.

Typical circuit components are shown in the following table:

| | |
|---|---|
| Resistor 52 | 100K Ω |
| Potentiometer 54 | 1M Ω |
| Diode 56 | 1N 914 |
| Transistor 50 | 2N 2222 or 2N 3904 |
| Relay 58 | SPST Relay with 500 Ω coil |
| Batteries 22 and 66 | 9 V |

During operation, when a fish exerts tension on the line 9, the probes which are normally above the water line will enter the water allowing a small current to flow between the battery 22 and the transistor 50 thereby energizing relay 58 so as to complete a circuit through battery 66 which turns on the transmitter 18 and the LED's 38 and 40, thereby broadcasting a radio signal from aerial 20 to the receiver 70 in the possession of the fisherman. While any suitable transmitter 18 can be used, a preferred transmitter comprises a programmable digital radio transmitter of the same general type as used, for example, in a commercial garage door opener in which a coded signal is transmitted whenever a circuit is completed through relay 58. The coded signal can, for example, comprise a digital numerically coded signal such as 0001101111001000. The digital receiver 70 is set by the operator to respond to the coded signal of that particular transmitter 18. When the correct coded signal is received by the receiver 70, the receiver emits a coded audible alarm such as a single beep or any predetermined number of beeps to alert the fisherman that a fish is on the line and that the signal came from bobber #1. The receiver can also display a light signal, audible and/or a vibrating signal. Other bobbers that are used by the fisherman are coded differently enabling the receiver 70 to produce a different series of beeps for each so that the fisherman knows which bobber has a strike. In order to control the sensitivity of the bobber 10, the probe 44 can be moved up or down or closer to the probe 42 or if desired, the potentiometer 54 can be adjusted to better suit the conditions of use, the conductivity of the water, etc.

The radio receiver 70 can comprise any suitable radio receiver circuit but preferably comprises a receiver similar to a commercially available display pager having a casing 72, a dialing pad 74, and an alphanumeric display 76 that also displays which of several bobbers has a strike. The pager is also provided with an ON/OFF switch 78, an audible alarm 80 and an LED 82. When the bobber 10 is to be used, the transmitter 18 is first programmed so that the desired number of alarm signals are produced by the audible alarm 80 or other alarm. Similar bobbers that are owned by the same fisherman can be programmed to produce a different number or kind of alarm signals each corresponding to a different bobber.

Figure 3:
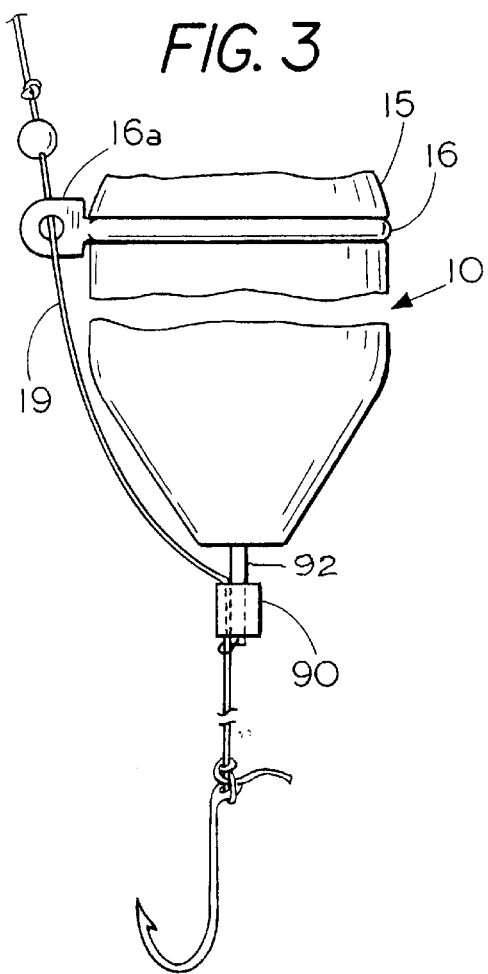
FIG. 3 is a partial side elevational view showing how a fishing line is connected to the bobber in accordance with the invention.

Refer now to FIG. 3, which shows another way of connecting the fishing line 9 to the bottom of the bobber. In this case, the line 9 passes under a sleeve 90, which is resiliently mounted, on a short peg 92 that extends from the bottom of bobber 10. Various other fasteners can be used to secure a fishing line to the bobber e.g., split washer type fasteners in which two washer halves are hinged together at a pivot point, allowing the halves to be brought together for enclosing the line within a hole at the center of the split washer. Any of a variety of other fasteners that can be employed for securing the fishing line 9 to the bobber 10 will be apparent to those skilled in the art.

Figure 4:
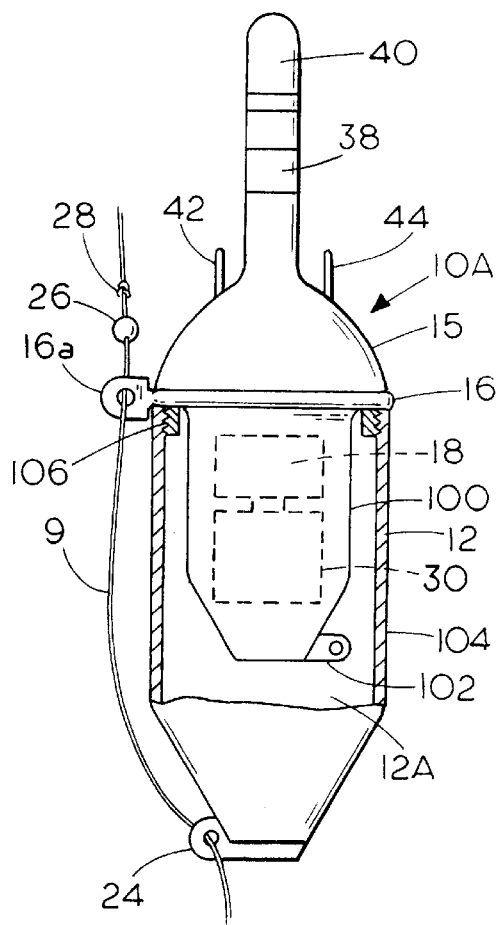
FIG. 4 is a perspective view partly in section of a modified form of bobber.

Refer now to FIG. 4, which shows a modified bobber, 10A wherein the same numerals refer to the corresponding parts described above. In this case the bobber 10A can be thought of as a bobber within a bobber. Here the sensing circuit 30 and transmitter 18 are both mounted within a hollow inner casing 100 having a perforated tab 102 for holding a fishing line like line 9. However, in this case, the inner casing 100 is enclosed within a substantially larger casing 104 which is screw threaded at 106 to the upper housing section 15 and sealed by "O" ring 16 to provide two sizes of bobbers in one unit. The bobber is ready for use as shown in FIG. 4. When, however, a smaller size bobber is needed, the user simply removes the outer casing 104 and reattaches the line 9 to the tab 102.

Many variations of the present invention within the scope of the appended claims will be apparent to those skilled in the art once the principles described herein are understood.

What is claimed is:

1. A fishing bobber with a strike-indicating transmitter, comprising:
    a bobber body adapted to float on a body of water and being adapted to have a fishing line connected thereto during use,
    a signal transmitter connected to the bobber,
    a transmitter switch operatively connected to the transmitter to actuate the transmitter for transmitting a signal responsive to a fish pulling on the line to thereby operate the signal transmitter to alert a fisherman when a fish exerts tension on a fishing line connected to the bobber,
    said switch comprising first and second electrically conductive probes at least one of which is spaced above the body of water in which the bobber is placed during use until the bobber is submerged whereupon an electrical circuit completed between the probes energizes the signal transmitter,
    said first probe is elongated,
    said first probe extends from the bobber body,
    said first probe is moveable with respect to the bobber body in a telescopic manner or in the direction of the second probe,
    such that the movement of the first probe changes the sensitivity of the bobber.

2. The fishing bobber of claim 1 wherein the bobber probes are positioned on a top portion of the bobber that is out of the water when no downward tension is applied to the fishing line.

3. The fishing bobber of claim 1 wherein the signal transmitter is a radio transmitter or a lamp.

4. The fishing bobber of claim 3 wherein the lamp is an LED.

5. The fishing bobber of claim 1 wherein the transmitter is a digital radio transmitter constructed to broadcast a digital code and including a digital radio receiver programmed to respond to digital signals of a predetermined code that are transmitted by the bobber to the receiver.

6. The fishing bobber of claim 5 wherein the receiver has an alphanumeric display, an audible signal or a visible signal.

7. The fishing bobber of claim 5 wherein the transmitter is programmed to produce a predetermined signal to the receiver whereby different bobbers each cause the receiver to produce a characteristic alarm signal.

8. The fishing bobber of claim wherein the receiver produces different numbers of alarm signals each corresponding to a particular bobber.

9. The fishing bobber of claim 1 wherein a means is provided for varying the sensitivity of the electrical circuit in detecting a change in the amount of current passing between the probes.

10. The fishing bobber of claim 1 wherein the bobber body has at least one casing.

* * * * *